US012622349B2

(12) United States Patent
Hartau et al.

(10) Patent No.: US 12,622,349 B2
(45) Date of Patent: May 12, 2026

(54) ROLL SEGMENT, ROLL AND AGRICULTURAL CROP TRANSPORTING AND/OR CLEANING DEVICE

(71) Applicant: Grimme Landmaschinenfabrik SE & Co. KG, Damme (DE)

(72) Inventors: Marcus Hartau, Wagenfeld (DE); Ludger Kolbeck, Damme-Rüschendorf (DE)

(73) Assignee: Grimme Landmaschinenfabrik SE & Co. KG, Damme (DE)

( * ) Notice: Subject to any disclaimer, the term of this patent is extended or adjusted under 35 U.S.C. 154(b) by 497 days.

(21) Appl. No.: 18/006,606

(22) PCT Filed: Jul. 29, 2021

(86) PCT No.: PCT/EP2021/071316
§ 371 (c)(1),
(2) Date: Jan. 24, 2023

(87) PCT Pub. No.: WO2022/023488
PCT Pub. Date: Feb. 3, 2022

(65) Prior Publication Data
US 2023/0270042 A1 Aug. 31, 2023

(30) Foreign Application Priority Data
Jul. 31, 2020 (DE) .......................... 202020104448.6

(51) Int. Cl.
*A01D 17/06* (2006.01)
*A01D 33/08* (2006.01)

(52) U.S. Cl.
CPC ............. *A01D 17/06* (2013.01); *A01D 33/08* (2013.01)

(58) Field of Classification Search
CPC ................................. A01D 17/06; A01D 33/08
See application file for complete search history.

(56) References Cited

U.S. PATENT DOCUMENTS

| | | | |
|---|---|---|---|
| 1,651,622 A | 12/1927 | Norman | |
| 9,238,254 B1 | 1/2016 | Davis | |

(Continued)

FOREIGN PATENT DOCUMENTS

| | | |
|---|---|---|
| CN | 105619688 A | 6/2016 |
| DE | 340588 | 9/1921 |
| DE | 1809145 B1 | 2/1970 |

(Continued)

*Primary Examiner* — Matthew R Buck
(74) *Attorney, Agent, or Firm* — Husch Blackwell LLP

(57) ABSTRACT

A roll segment is provided for a roll of an agricultural crop transporting and/or cleaning device which has a plurality of rolls, which are oriented at least substantially transversely to the transport direction and which are preferably formed as spiral rolls in succession in the transport direction, and via which, during operation, the crops are transported for cleaning and/or transport purposes. The roll segment has a longitudinal axis which, during operation, corresponds to a rotation axis and, for the purpose of forming the roll with at least one further roll segment extending in the direction of the longitudinal axis during operation, has at least at one end at least one first connection element which is designed for connection to a further connection element of the further roll segment.

20 Claims, 7 Drawing Sheets

(56)  References Cited

U.S. PATENT DOCUMENTS

2016/0227703 A1*   8/2016  Dettmer ................... B07B 1/15
2020/0338595 A1   10/2020  Davis

FOREIGN PATENT DOCUMENTS

DE          19625743  A1      1/1998
EP           1082912  A2      3/2001
EP           1661471  A1      5/2006
EP           1921027  A1      5/2008
GB          201002774          4/2010

* cited by examiner

ROLL SEGMENT, ROLL AND AGRICULTURAL CROP TRANSPORTING AND/OR CLEANING DEVICE

CROSS REFERENCE

This application claims priority to PCT Application No. PCT/EP2021/071316, filed Feb. 3, 2022, which itself claims priority to German Patent Application No. 20 2020 104448.6, filed Jul. 31, 2020, the entireties of both of which are hereby incorporated by reference.

FIELD OF THE INVENTION

The present invention relates to a roll segment for a roll of an agricultural crop transporting and/or cleaning device which has a plurality of rolls, which are oriented at least substantially transversely to the transport direction and which are preferably formed as spiral rolls in succession in the transport direction, and via which, during operation, the crops are transported for cleaning and/or transport purposes, wherein the roll segment has a longitudinal axis which, during operation, corresponds to a rotation axis and, for the purpose of forming the roll with at least one further roll segment extending in the direction of the longitudinal axis during operation, has at least at one end at least one first connection element which is designed for connection to a further connection element of the further roll segment.

BACKGROUND OF THE INVENTION

Such an object which is described in EP 3 064 283 A2, for example, has proved disadvantageous in that dirt penetrates into the respective connecting regions between the roll segments. This makes it more difficult for the respective roll segments to be able to be released from one another or from a drive shaft of a crop transporting and/or cleaning device. Moreover, the penetrated dirt ensures an increase in the diameter of the connecting region, since due to the dirt the connection elements of adjacent roll segments no longer bear against one another correctly. This in turn leads to increased wear on the roll segments.

BRIEF SUMMARY

It is the object of the present invention to improve an object of the type in question with regard to these drawbacks.

According to the invention it is provided that, when viewed in a direction parallel to the longitudinal axis, the roll segment has at least one and preferably at least two undercut first end regions, at least one thereof being formed by the first connection element. The result of both a variant with one undercut first end region and a variant with two undercut first end regions is that it is more difficult to produce a connection with an adjoining roll segment, which can have a complementary shaping, for forming a roll. This drawback, however, is remedied by producing an improved connection of the respective roll segments. For example, the undercut end region is formed by a thickening of the connection element which is formed transversely to the direction of the longitudinal axis.

The first connection element forms at least one of the first undercut end regions so that in a simple case only the first connection element is changed relative to the previously known roll segments and a relatively similar shaping can be present, at least regarding the first end region. There can be a plurality of first connection elements which can be arranged so as to be uniformly distributed over the circumference of the roll segment on the front face. The first connection element can also be a collar circulating on the front face and at least in some portions in the circumferential direction, with a latching lug forming the above-described thickening. It goes without saying that this latching lug can be identified as such at least in a sectional view and forms a latching edge circulating in the circumferential direction. Moreover, the first connection element can also have further latching lugs or thickenings which, when connected, can be inserted into a groove of a further roll segment known from the prior art, in order to achieve an improved seal. When connected, one respective thickening results in the material being compressed, the production of a gap in the case of an external load, due to the crops to be transported, being able to be at least partially prevented thereby since the compressed material expands. The formation of at least two undercut first end regions by, for example, two thickenings present in a longitudinal section ensures that the connection is correspondingly doubled. In particular, the first connection element is formed by a collar running over the entire circumference on the front face along the circumference of the roll segment-a protruding part of the roll segment.

Generally parts of the roll segment which are present on the front face and which serve for connecting to and/or bearing against a further roll segment are denoted as end regions, wherein the front face is the side which faces a further roll segment when connected.

Preferably, when viewed in a direction parallel to the longitudinal axis, the roll segment is provided at the other end, i.e. at the other end on the front face, at least with one, and preferably at least with two, undercut second end regions, at least one thereof being formed by a second connection element. This connection element corresponds, in particular, to the further connection element of a further roll segment, denoted above, to which the first roll segment can be fastened, wherein the first undercut end region can be formed in an at least substantially complementary manner to the second connecting region. The formation of two undercut regions both in the first end region and in the second end region, which are at least substantially complementary to one another, leads to a doubly secured connection, in particular in the manner of a labyrinth seal which is not without contact, however. The connecting region or the inner region is sealed by repeated deflections such that the penetration of dirt is reduced or even eliminated.

Preferably, the second connection element is formed by an outer jacket extension of the roll segment, so that the undercut end region of the second connection element, in particular, can be a region which is oriented inwardly toward the longitudinal axis and which is thus not accessible easily from the outside.

Preferably, the outer jacket extension forms the undercut second end region as part of a groove which is open on the front face and into which the first connection element of a further roll segment can engage. Depending on the shape of the undercut region, a more or less strong latching connection is formed which counteracts the pulling apart of the roll segments which are connected together.

It goes without saying that such a latching connection does not necessarily have to be implemented by surfaces which are formed at right-angles to the longitudinal axis and which cannot be easily released from one another, or even not at all, for the purposes of maintenance. The surfaces can also be rounded and/or curved surfaces which are set obliquely, i.e. not at right-angles to the longitudinal axis, an undercut region, when viewed in the longitudinal direction, being formed thereby. The essential aim of the connection is not to avoid pulling apart the roll segments in the longitudinal axis, but to seal the gap between two roll segments in an improved manner, which in particular is also possible by a plurality of undercut regions which are also provided with rounded contours in longitudinal section. In particular, therefore, the undercut regions in the longitudinal direction are not defined by surfaces formed at right-angles to the longitudinal axis.

For the further improved configuration of the connecting region, the roll segment is preferably provided with an inner jacket region which—in a variant with two undercut second end regions—has an outer latching lug for forming one of the undercut second end regions. As well as the latching lug, the outer latching lug is also identifiable in a sectional view and represents a fully circumferential part of the roll segment in the circumferential direction.

The outwardly facing bead or lug can transition into a wall region of the roll segment, forming the groove for introducing the first connection element of a further roll segment, so that these connection elements on the front face can be produced, in particular, in one piece with the outer jacket of the roll segment.

Preferably, the outer latching lug of the inner jacket region extends further radially away from the longitudinal axis than a part of the first end region, in particular further than an inner shoulder of the first connection element so that, when connected, the inner jacket region in a bearing position with a further roll segment, when viewed in the longitudinal direction, engages behind parts of the first connection element of the further roll segment.

A roll segment correspondingly provided with first and second end regions which are formed in a complementary manner to one another can thus provide a doubly secured and improved sealed connection with further roll segments which counteracts the penetration of dirt in an improved manner during operation.

Advantageously, the roll segment is provided with a connecting surface which is provided on the front face and for bearing against a further roll segment and which is formed at least in some portions to be angled by an angle of 90° relative to the longitudinal or rotation axis. This surface forms, in particular with a jacket surface, a wedge shape in which the tip of the wedge is external, when viewed radially from the longitudinal axis. When fastening a plurality of roll segments on a shaft by pretensioning, an outermost connecting region is particularly pretensioned so that the penetration of dirt in the outermost region of the jacket surface (any webs not taken into account) is already prevented in an improved manner. Preferably, and in order to compensate for changes to the outer diameter associated with the compression, when connected by pretensioning, a jacket surface of the wedge-shaped region is spaced apart slightly less from the longitudinal axis than the jacket surface at the other end on the front face. The jacket surface of the roll segment thus forms, when compressed, a relatively accurate cylinder jacket surface (without having to take any webs into account).

Preferably, the outermost front-face ends or corners of the jacket surface of a roll segment are also formed with a different radial spacing relative to the longitudinal or rotation axis such that, with a wedge-shaped configuration of a connection surface region, the jacket surfaces transition into one another flush and without an offset when fastened by pretensioning.

Preferably, the roll segment has at least one channel which preferably runs in a spiral-shaped manner on the inner face of the first and/or the second connection element toward the longitudinal axis. This channel runs in a spiral-shaped manner about the longitudinal axis, wherein a 360° rotation of the longitudinal axis does not necessarily occur within a roll segment, but this can result only by the formation of a roll with channels which adjoin one another and which are aligned with one another.

Preferably, the roll segment according to the invention has at least one web running through the channel toward the longitudinal axis, the stability of the connecting region being able to be further influenced thereby. Depending on the desired stiffness of the connecting region the web can run in a linear or curved manner, whereby the flexibility of the respective connecting region can be correspondingly influenced and, for example, can be adapted in a targeted manner to the respective harvesting and transporting conditions. In particular, the web is arranged between one of the connection elements and a core of the roll segment. In the case of a plurality of channels in the circumferential direction, a corresponding number of webs can be present, the webs also being partially extended in the circumferential direction and not all having to be identifiable in a longitudinal section.

In particular, the web seals a channel completely in the circumferential direction so that media cannot be exchanged with an adjacent roll segment through the channel, which in turn influences the damping properties. Alternatively or additionally, all of the webs or even individual webs can be formed with walls which have holes for the purpose of adjusting a desired flexibility of the web.

The channel can be filled with air and/or with a more resilient material relative to a connection element material, whereby an adaptation to harvesting conditions is possible in a flexible manner.

Preferably, the roll segment has a cylinder element which is metal or which is produced from plastics and which is provided with recesses, a recess which is non-circular in cross section being located therein for receiving a drive shaft. As a result, the forces originating from a drive shaft are transferred more effectively into the roll segment. This applies, in particular, to cast-in cylinder elements which are correspondingly incorporated in the material of the roll segment.

The object set forth in the introduction is also achieved by a roll which has a plurality of roll segments which are described above or below. The roll segments which are connected together via the corresponding connecting regions are sealed counter to the penetration of dirt in an improved manner relative to the prior art.

Preferably, the parts which are latched together of a first end region of a first roll segment and a second roll segment are formed with an oversize relative to one another so that no gaps are produced when the parts are deformed and the compressed material expands into a region which otherwise would open to form a gap due to the deformation. Accordingly, it is advantageous if in an initial position of the roll, which is not subjected to load by external forces, regions with differently compressed material alternate along the external contour of the respective end regions. Preferably, at least three regions with more highly compressed material are present in order to provide a good seal in critical regions in which gaps could otherwise be produced.

Regarding the formation of a dirt-free connection it is also advantageous if conveying webs, which extend along the outer face of the roll segments and which transition into one another, adjoin one another with front faces which are angled relative to a plane formed perpendicular to the longitudinal central axis.

Additionally, the object set forth in the introduction is achieved by an agricultural crop transporting and/or cleaning device with a drive unit, wherein this crop transporting and/or cleaning device has at least one roll as described above or below and this roll can be driven by the drive unit. In each case, a roll is assigned a drive shaft which runs through central recesses of the roll segments and is held therein for transmitting a torque. This transporting and/or cleaning device also has the advantages described above and below.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
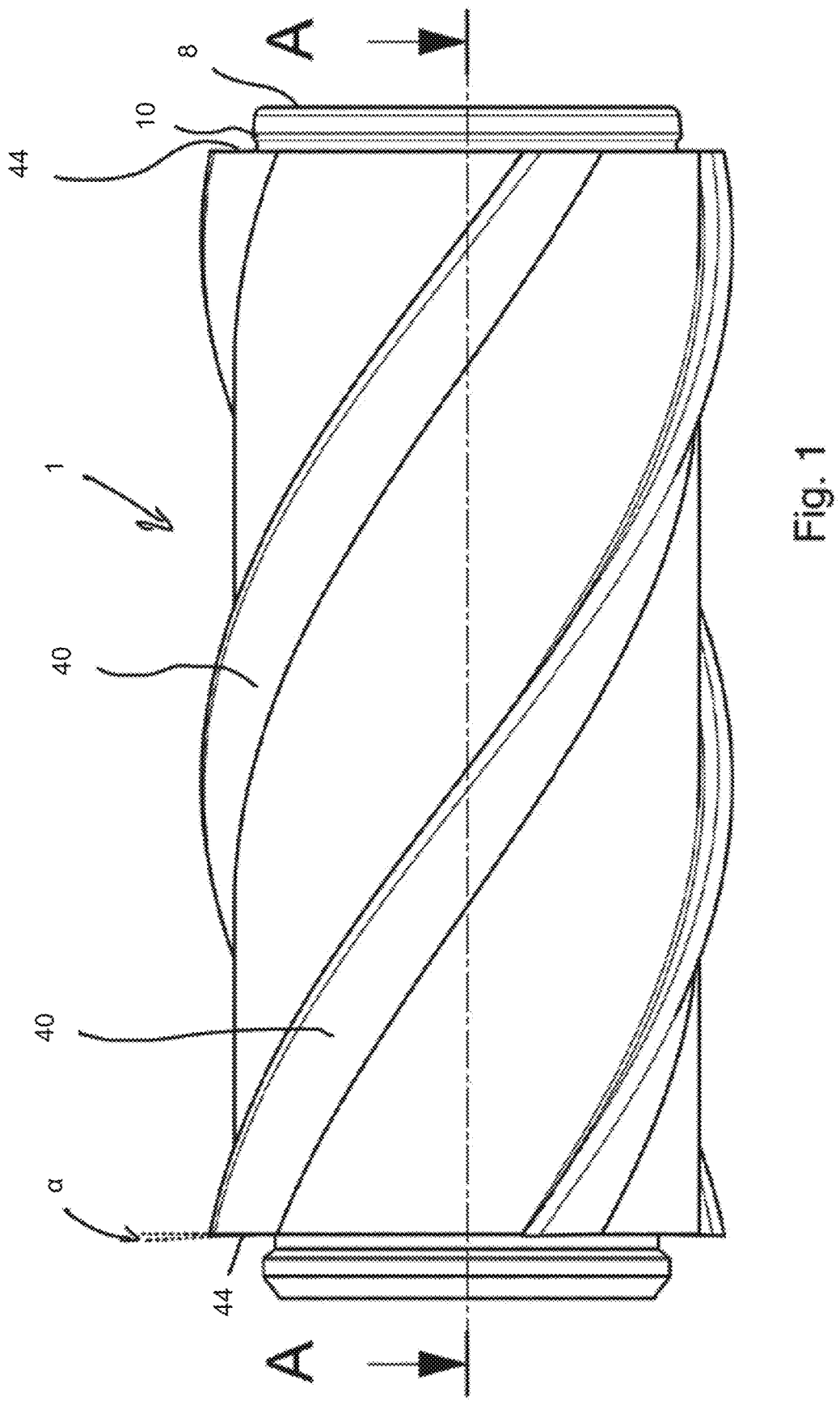
FIG. 1 shows an object according to the invention.
Figure 2:
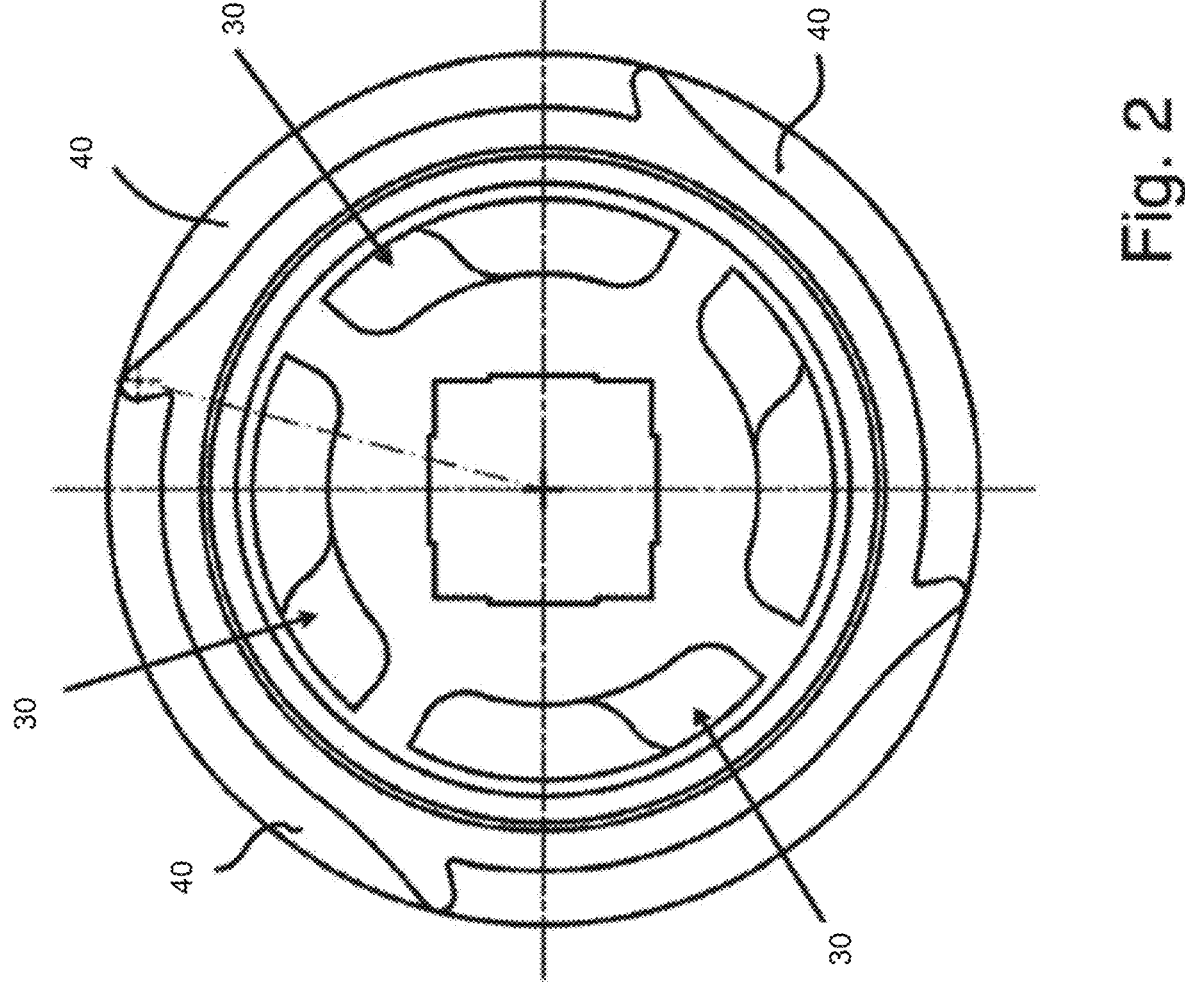
FIG. 2 shows the object according to FIG. 1 in a view of a front face.

Individual technical features of the above-described exemplary embodiments, in combination with the above-described exemplary embodiments and the features of one of the independent claims and any further claims, can also be combined to form objects according to the invention. If expedient, elements having the same function are provided with identical reference signs.

A roll segment 1 according to the invention is connected during operation to one or two further roll segments 2 and rotates about a rotation axis which also corresponds to a longitudinal axis 4 of the roll segment. For the purpose of connecting to a further roll segment, the roll segment 1 has two undercut first end regions 6 which in the present case (FIG. 3) are formed by a first connection element 8 and are arranged once on the inner face and once on the outer face. The first connection element 8 is formed by a collar running on the front face and in the circumferential direction with a latching lug 10 (FIGS. 1 to 4). In particular, the connection element 8, as shown, is formed integrally with a jacket part 12 of the roll segment 1.

Figure 3:
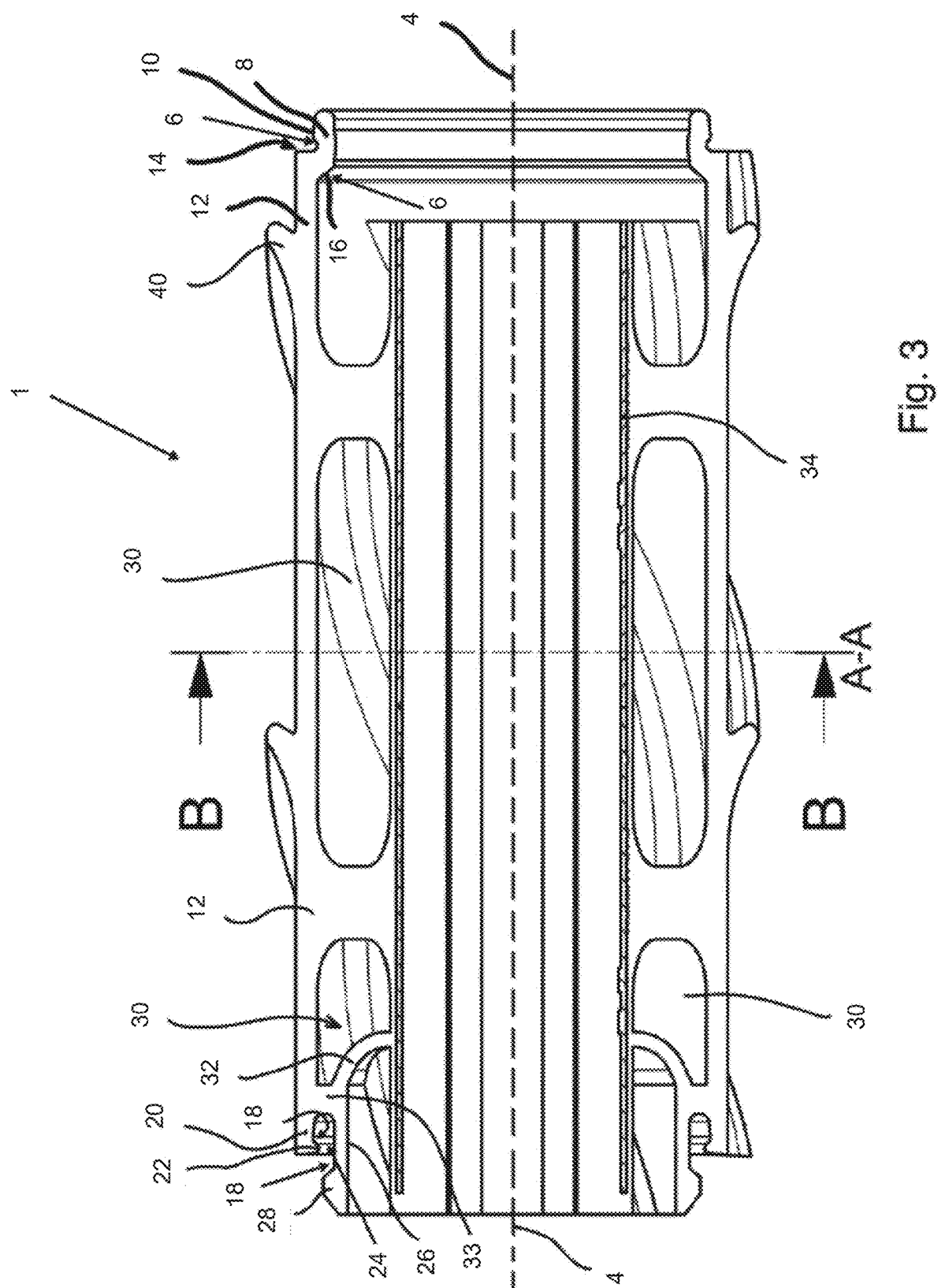
FIG. 3 shows the section along A-A shown in FIG. 1.

Due to an offset of the first connection element 8 relative to the end of the further jacket part 12 on the front face, an outer shoulder 14 is produced and an inner shoulder 16 which forms an undercut region 6 is produced, when viewed in the axial direction and relative thereto in FIG. 3 from right to left. In particular, the two undercut first end regions 6 are formed on different sides of the connection element 8, on the one hand on the side toward the rotation axis 4 (inner shoulder 16) and also on the side facing away from the rotation axis 4 (left from the latching lug 10). Due to a pressure produced during operation in the direction perpendicular to the rotation axis and longitudinal axis 4 in the region of the connection element 8, either the one or the other undercut first end region is acted upon, therefore, so that at least one of the regions contributes more to reinforcing the connection.

Two undercut second end regions 18, which as well as the first end regions 6 also circulate around the rotation axis 4 in the circumferential direction, are also formed at the other end of the roll segment 1, also on the front face (in FIG. 3 at the left-hand end). The further second undercut end region 18 on the outer face is formed by a second connection element 20 in the from of an outer jacket extension of the jacket part 12 and is correspondingly integral therewith.

The outer jacket extension has a circumferential further latching lug 22 which defines an inlet opening on the front face for a groove 24 which is correspondingly open on the front face. On the inner face, i.e. toward the longitudinal and rotation axis 4, this groove 24 is defined by an inner jacket region 26 which in turn has an outer latching lug 28 for forming the second of the undercut second end regions 18. The inner jacket region 26 and the second connection element 20 represent the connecting partners for the connection to a first connection element of a further roll segment of identical shaping.

Figures 5, 6:
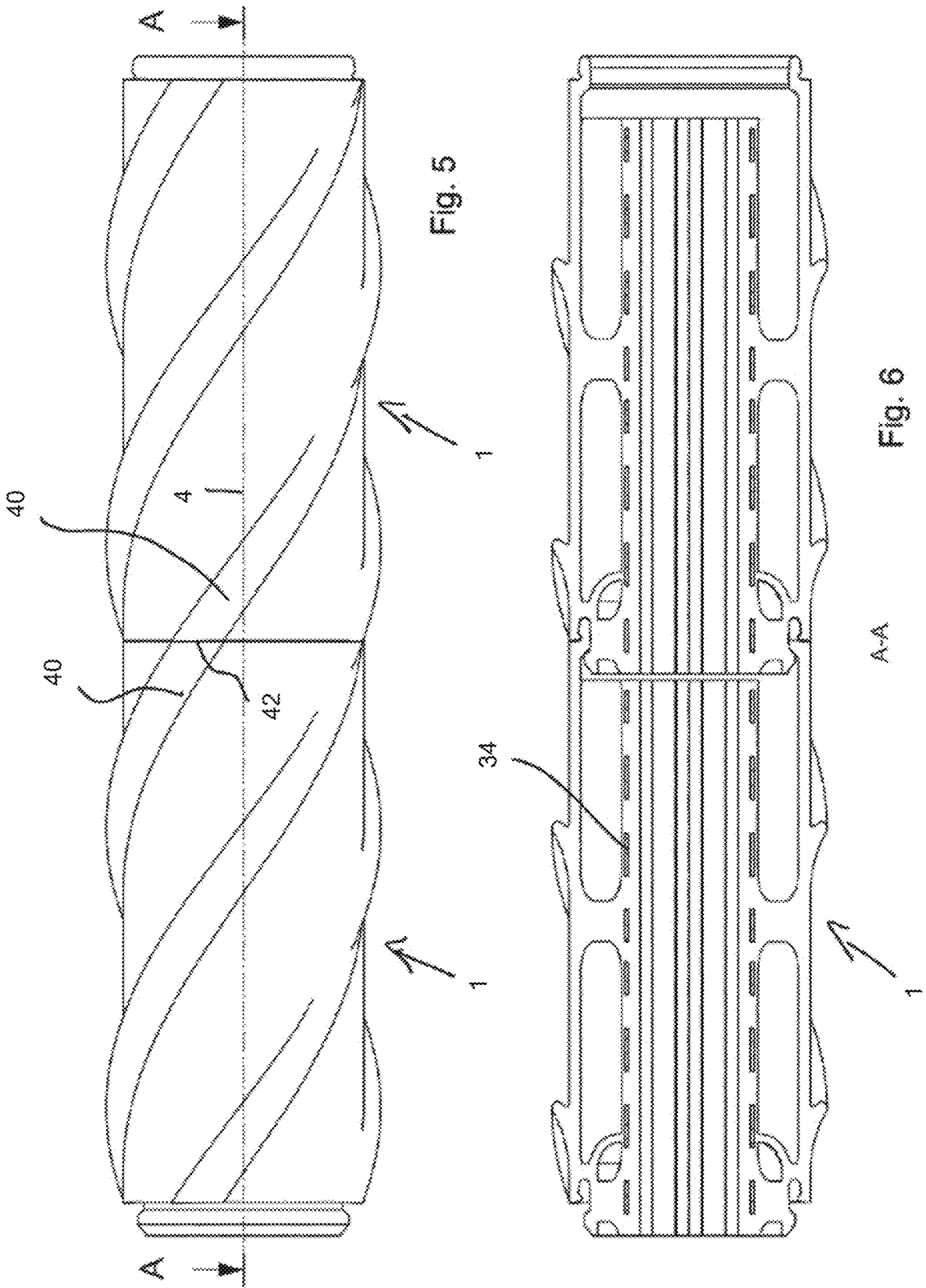
FIG. 5 shows a part of a roll according to the invention.
FIG. 6 shows the view along A-A shown in FIG. 5.

The outer latching lug 28 extends in the radial direction further away from the longitudinal axis 4 than a part of the inner shoulder 16 and is latched therewith when connected (see FIGS. 5 and 6).

Moreover, on the inner face of the connection elements relative to the longitudinal axis 4 the roll segment 1 has a total of four air-filled channels 30 which run in a spiral shaped manner and in some portions, i.e. not fully circumferentially around the longitudinal central axis 4, the damping properties of the roll segment being determined by the size thereof. In each case a conveying web 40 running in the rotational direction about the rotation axis or longitudinal axis 4 extends in the right-hand end region in FIG. 3 of one respective channel 30. The front end point of a channel 30 runs ahead of the rear end point of the assigned conveying web 40 by 20° to 30°, when viewed in the direction of the longitudinal axis 4.

A web 32 running through the channel 30 is connected to the inner jacket region 26. As a result, this end of the roll segment on the front face is stiffened. The web 32 is arranged, in particular, on the base of the groove 24 and thus supports the inner jacket region 26 and the second connection element 20. In the present case, the channel 30 is completely sealed by the formation of the web 32 which in the present case runs in a curved manner from the base 33 in the direction of the longitudinal axis 4.

Figure 4:
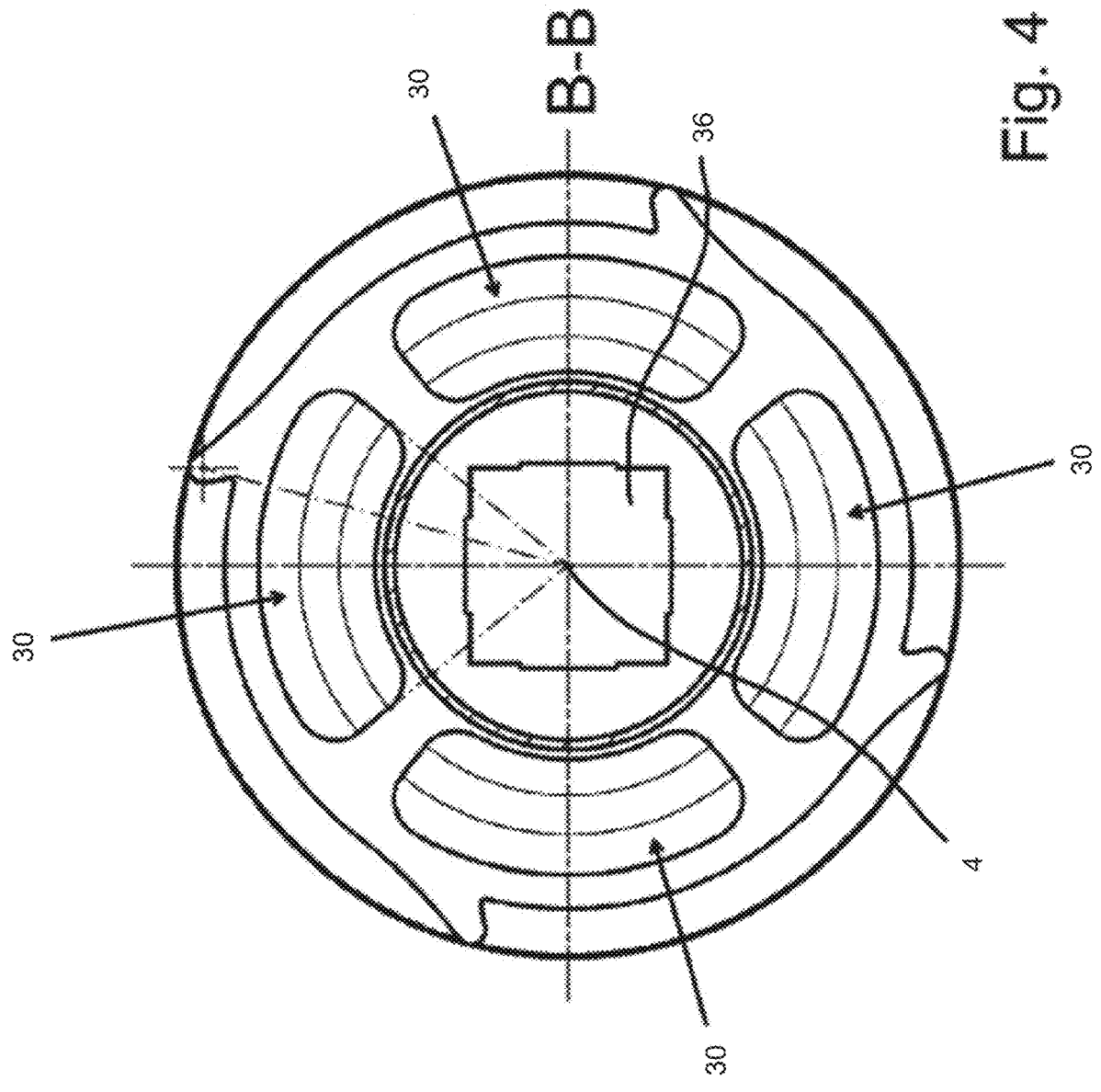
FIG. 4 shows the section along B-B shown in FIG. 3.

Moreover, the roll segment 1 is provided with a cylinder element 34 which is produced from plastics and which is provided with recesses, a recess 36 which is non-circular in cross section being located therein for receiving a drive shaft (see FIGS. 3 and 4).

At least two roll segments which are connected together result in the formation of a roll according to the invention, wherein the facing ends of the roll segments are fixed to one another via the respective connecting regions and undercut regions (FIG. 6). The recesses of the cylinder element 34 can also be identified in this figure. In order to prevent the connection elements, which are subjected to load during operation, from being moved away from one another under the influence of external forces due to the transported crops, and thereby forming gaps, the parts of a first roll segment 1 and a second roll segment 1 which are latched together are formed with an oversize relative to one another. In the connecting position, therefore, in particular the regions denoted in FIG. 8 by 38 are those regions in which material is compressed. When connected, therefore, regions with differently compressed material alternate along the external contour of the roll segments 1. If the connection elements 8 and 20 were to move away from one another in some regions due to an external load, the formation of a gap would be prevented by the expansion of the compressed material.

To avoid the penetration of dirt between the conveying webs 40 of the respective roll segments which transition into one another, these roll segments are provided with front faces which are angled relative to a plane formed perpendicular to the longitudinal axis 4. Respective front faces 44 which are angled (angle α, FIG. 1) and/or curved relative to a plane perpendicular to the longitudinal axis 4 (see FIG. 1) run from an outer edge 42 of the conveying webs 40, shown in FIG. 5.

Figure 8:
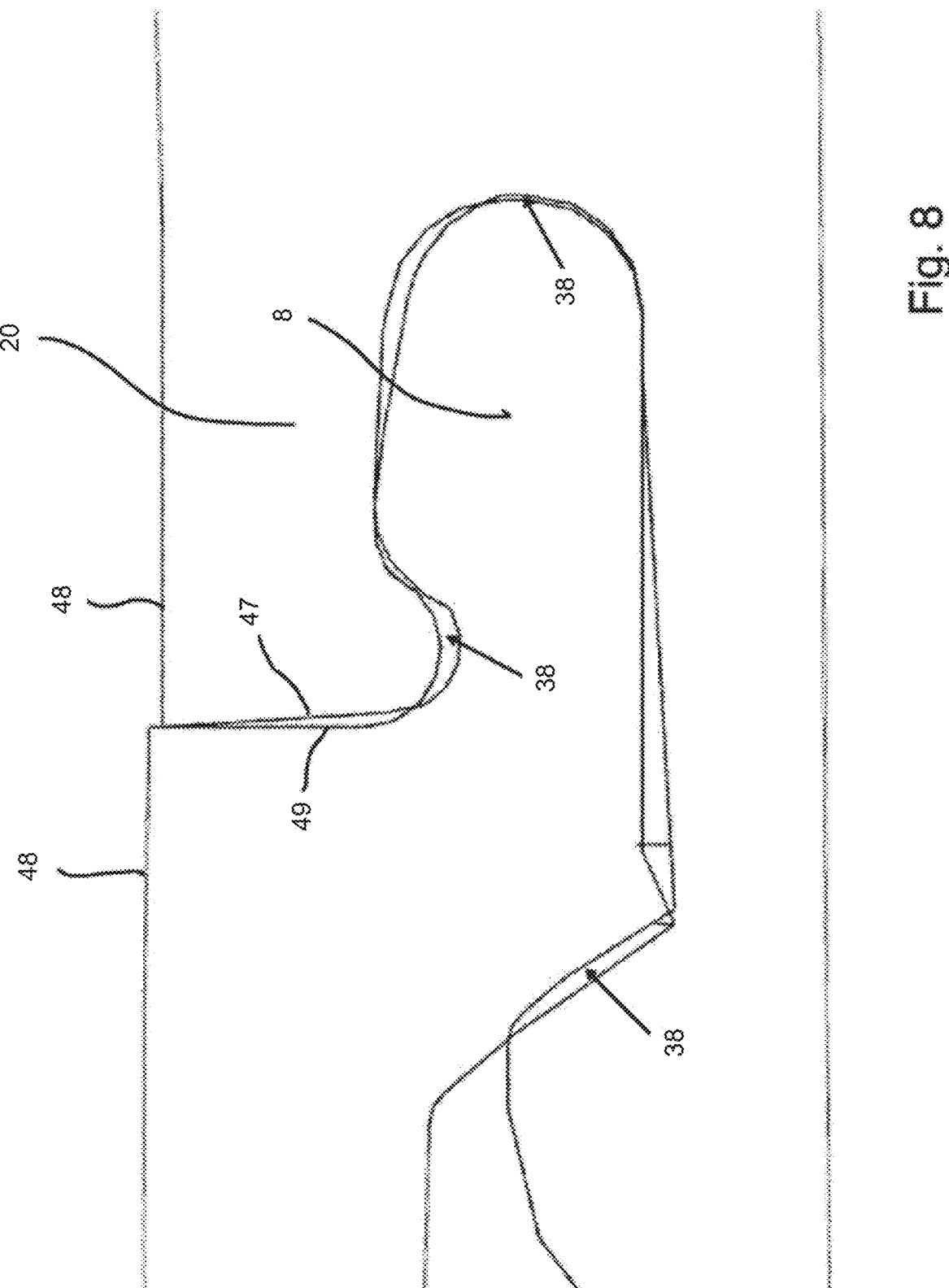
FIG. 8 shows a detailed view of a connection of two roll segments without pretensioning.

The gap between adjacent roll segments is closed due to the pretensioning by ca. 4 mm for each connecting region, the gap being produced as a result of the connecting surface 47 (FIG. 8) which is not perpendicular to the longitudinal axis 4 and the counterpart 49 running perpendicular thereto. The outer shoulder 14, which has the flat counterpart 49 to the connecting surface 47, is pretensioned by the tip of the wedge, whereby additionally the penetration of dirt is prevented. By the slightly smaller radial distance of the outermost corner of the connecting surface 47 or the adjoining jacket surface from the longitudinal axis 4 in comparison with the outermost corner of the counterpart 49, it is also ensured by the pretensioning that the jacket surfaces 48 of the jacket part 12 have no offset, as shown in FIG. 8, but transition flush into one another.

Figure 7:
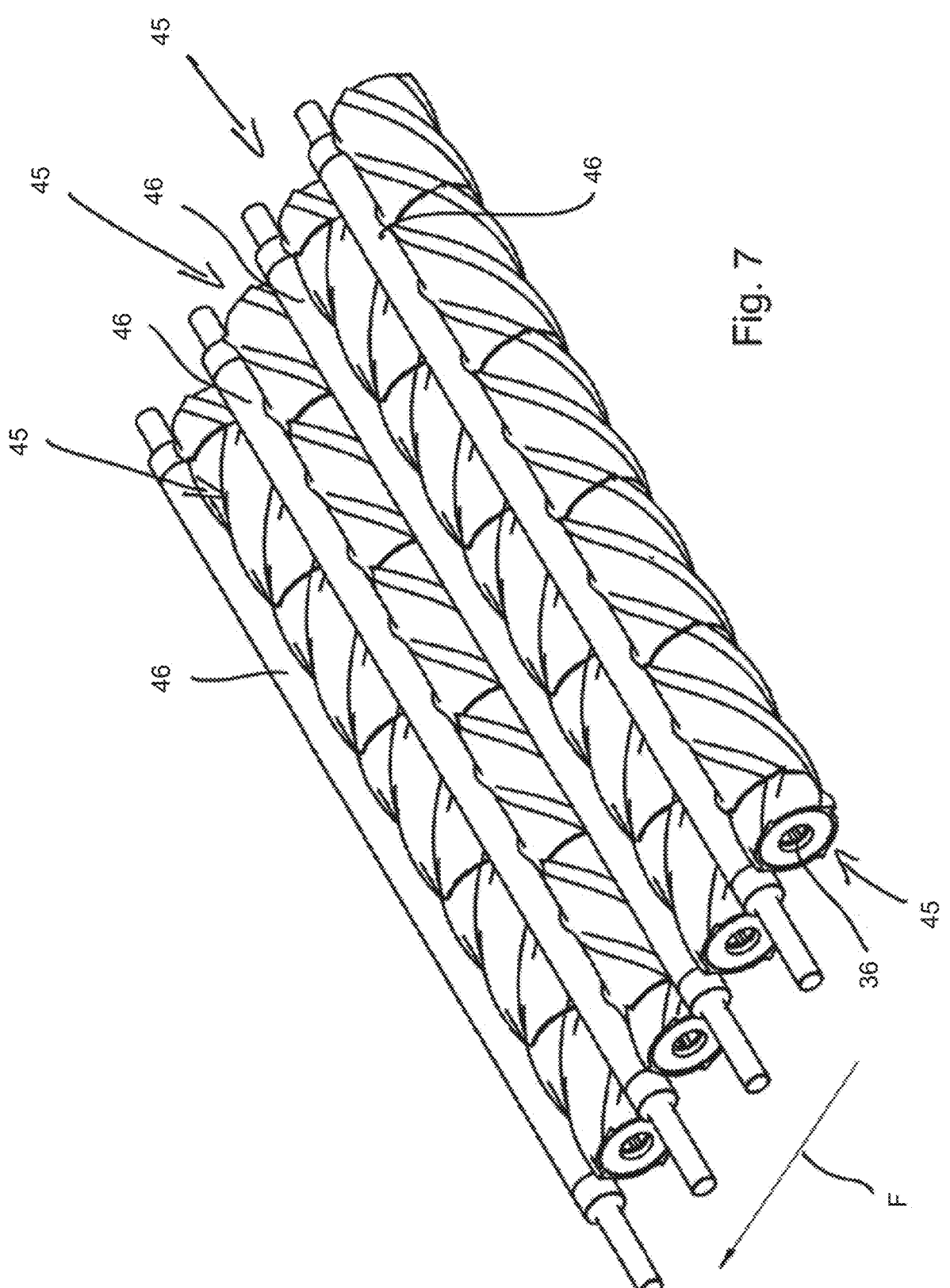
FIG. 7 shows parts of a crop transporting and cleaning device according to the invention.

Four rolls 45 according to the invention, which in the present case in each case have 6 roll segments, are part of an agricultural crop transporting and/or cleaning device according to the invention, which is illustrated in principle in FIG. 7 but which is shown without a drive unit. This device comprises four drive shafts, not shown in more detail, which engage in the corresponding recesses 36 of the rolls and are held therein for transmitting a torque to the rolls. By the rotation of the rolls 45, crops such as potatoes are transported and cleaned in the conveying direction F. The roll segments which form a roll 45 have different lengths in the direction of the longitudinal axis 4. The number of roll segments is dependent on the length of the roll 45 so that, as a result, different numbers of roll segments are also conceivable for each roll 45. Moreover, the crop transporting and/or cleaning device comprises smooth rolls 46 arranged between the rolls 45 according to the invention.

What is claimed is:

1. A roll segment for a roll of an agricultural crop transporting device, the roll segment defining a rotational axis and comprising:
   a first connection element extending axially from a first end and defining an inner ramped shoulder;
   a second connection element extending axially from a second end; and
   a third connection element extending axially from the second end concentrically within the second connection element,
   wherein
      the first connection element is complementary to second and third connection elements of an additional roll segment, the first connection element being shaped to matingly fit between the second and third connection elements of the additional roll segment,
      the third connection element is complementary to a first connection element of the additional roll segment,

8 the third connection element being shaped to matingly engage an inner ramped shoulder of the additional roll segment.

2. The roll segment of claim 1, wherein the first connection element includes a collar extending circumferentially about the rotational axis and a latching lug extending radially outwardly from the collar.

3. The roll segment of claim 1, wherein the second connection element includes a first latching lug extending radially inwardly.

4. The roll segment of claim 3, wherein the second connection element includes an outer jacket extending axially from the second end.

5. The roll segment of claim 4, wherein the first latching lug extends radially inwardly from the outer jacket.

6. The roll segment of claim 3, wherein the third connection element includes an inner jacket extending axially from the second end and a second latching lug extending radially outwardly from the inner jacket.

7. The roll segment of claim 6, wherein the second latching lug is matingly complementary to the inner ramped shoulder of the additional roll segment.

8. The roll segment of claim 1, wherein a connecting surface disposed on a front face of the first end is substantially perpendicular to the rotational axis.

9. The roll segment of claim 1, wherein a cylindrical wall defines a channel.

10. The roll segment as claimed in claim 9, wherein a web encloses the channel.

11. The roll segment of claim 10, wherein the web extends in one or more of a linear manner and a curved manner.

12. The roll segment of claim 9, wherein the channel is filled with one or more of air and a filling that is less stiff than the first, second, and third connection elements.

13. The roll segment as claimed in claim 1, further including:
   a cylinder element defining a non-circular recess configured to receive a drive shaft.

14. The roll segment of claim 1, wherein the second and third connection elements define a groove that extends circumferentially about the rotational axis.

15. A roll for an agricultural crop transporting and/or cleaning device, the roll defining a rotational axis and comprising:
   a first roll segment having a first connection element extending axially from a first end, the first connection element having an inner ramped shoulder; and
   a second roll segment having second and third connection elements extending axially from a second end, wherein
      the first connection element is configured to removably matingly fit between the second and third connection elements, and
      the third connection element is configured to removably matingly engage the inner ramped shoulder.

16. The roll segment of claim 15, wherein the first roll segment and the second roll segment are configured to join via an interference fit.

17. The roll of claim 16, wherein regions of the first and second roll segments with differently compressed material alternate along external contours of the first and second roll segments.

18. The roll as claimed in claim 15, wherein
   respective first and second conveying webs of the first and second roll segments extend along respective first and second outer faces of the first and second roll segments, and the first and second conveying webs transition into one another, adjoin one another along the respective first and second front faces, and are angled relative to a plane substantially perpendicular to the rotational axis.

19. The roll of claim 15, wherein the first and second roll segments are formed as a spiral roll in succession with an additional roll in a transport direction.

20. An agricultural crop transporting and/or cleaning device comprising:

a drive shaft; and a roll driven by the drive shaft, the roll defining a rotational axis and including a first roll segment having a first connection element extending axially from a first end, the first connection element having an inner ramped shoulder, and a second roll segment having second and third connection elements extending axially from a second end, wherein the first connection element is configured to removably matingly fit between the second and third connection elements, and the third connection element is configured to removably matingly engage the inner ramped shoulder.

\* \* \* \* \*